(12) United States Patent
Nakamura

(10) Patent No.: US 9,190,924 B2
(45) Date of Patent: Nov. 17, 2015

(54) INDIRECT MATRIX CONVERTER

(75) Inventor: Kazuhito Nakamura, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 298 days.

(21) Appl. No.: 13/816,098

(22) PCT Filed: Aug. 2, 2011

(86) PCT No.: PCT/JP2011/067664
§ 371 (c)(1),
(2), (4) Date: Mar. 6, 2013

(87) PCT Pub. No.: WO2012/020664
PCT Pub. Date: Feb. 16, 2012

(65) Prior Publication Data
US 2013/0188404 A1 Jul. 25, 2013

(30) Foreign Application Priority Data

Aug. 10, 2010 (JP) .................................. 2010-179370

(51) Int. Cl.
*H02M 1/34* (2007.01)
*H02M 5/458* (2006.01)
(Continued)

(52) U.S. Cl.
CPC .............. *H02M 5/458* (2013.01); *H02M 5/297* (2013.01); *H02M 5/225* (2013.01); *H02M 2001/348* (2013.01)

(58) Field of Classification Search
CPC ................... H02M 2007/4815; H02M 5/4585; H02M 1/32; H02M 1/34; H02M 1/36; H02M 7/129; H02M 7/48; H02M 7/5387; H02M 7/003
USPC .......... 363/13, 34, 37, 50, 52, 55, 56.05, 125, 363/131
See application file for complete search history.

(56) References Cited

U.S. PATENT DOCUMENTS 4,788,485 A * 11/1988 Kawagishi et al. ........... 318/811
5,949,672 A * 9/1999 Bernet .......................... 363/159
(Continued)

FOREIGN PATENT DOCUMENTS

DE 41 21 177 A1 1/1992
DE 43 21 988 A1 1/1994
(Continued)

OTHER PUBLICATIONS

J.W. Kolar et al., Novel Three-Phase AC-DC-AC Sparse Matrix Converter, Applied Power Electronics Conference and Exposition, 2002. APEC 2002. Seventeenth Annual IEEE, 2002, vol. 2, pp. 777-791.
(Continued)

*Primary Examiner* — Adolf Berhane
(74) *Attorney, Agent, or Firm* — Duane Morris LLP

(57) ABSTRACT

An indirect matrix converter includes a converter (2) connected through a positive polarity bus (4p) and a negative polarity bus (4n) to an inverter (6). A clamp diode (28u) has its anode connected to the positive polarity bus (4p) and has its cathode connected to one end of a capacitor (30). The other end of the capacitor (30) is connected to the anode of a clamp diode (28d) of which cathode is connected to the negative polarity bus (4n). Upper discharge preventing snubber circuits (20u) are provided for switch devices (16uu through 16uw) of the inverter (6), and lower discharge preventing snubber circuits (20d) are provided for switch devices (16du through 16dw) of the inverter (6). Discharge resistors (26u) of the upper discharge preventing snubber circuits (20u) are connected to the anode of the diode (28d), and discharge resistors (26d) of the lower discharge preventing snubber circuits (20d) are connected to the cathode of the diode (28u).

6 Claims, 12 Drawing Sheets

(51) Int. Cl.
*H02M 5/297* (2006.01)
*H02M 5/22* (2006.01)

(56) References Cited

U.S. PATENT DOCUMENTS

| | | | | |
|---|---|---|---|---|
| 6,566,764 | B2* | 5/2003 | Rebsdorf et al. | 290/44 |
| 8,848,410 | B2* | 9/2014 | Uchino et al. | 363/159 |
| 2007/0177407 | A1* | 8/2007 | Bruckmann et al. | 363/8 |
| 2011/0115285 | A1* | 5/2011 | Ransom et al. | 307/9.1 |
| 2012/0063178 | A1* | 3/2012 | Fujita et al. | 363/37 |
| 2013/0038121 | A1* | 2/2013 | Nakamura et al. | 307/9.1 |
| 2014/0035491 | A1* | 2/2014 | Mukai et al. | 318/400.02 |

FOREIGN PATENT DOCUMENTS

| | | |
|---|---|---|
| GB | 2298747 A | 9/1996 |
| JP | 8-251908 A | 9/1996 |
| JP | 9-56166 A | 2/1997 |
| JP | 11-103577 | 4/1999 |
| JP | 2002-141464 A | 5/2002 |
| JP | 2006-20384 A | 1/2006 |
| JP | 2012039810 A * | 2/2012 |
| WO | WO2008/087689 A1 | 7/2008 |

OTHER PUBLICATIONS

K. Shinohara and K. Yamamoto, "Technical Trends of Direct AC/AC Converter," Institute of Electrical Engineering of Japan. D vol. 126 No. 9, pp. 1161-1170, 2006.

International Search Report dated Oct. 14, 2011 in corresponding International Application No. PCT/JP2011/067664.

Office Action issued on Jan. 10, 2014 in corresponding Korean Patent Application No. 2013-7002693.

Friedli, T.; Heldwein, M.L.; Giezendanner, F.; Kolar, J.W, "A High Efficiency Indirect Matrix Converter Utilizing RB-IGBTs," Power Electronics Specialists Conference, 2006. PESC '06. 37th IEEE, 7 pages, Jun. 18-22, 2006.

European Patent Office, Supplementary European Search Report corresponding to European Application No. EP 11 81 6330.2 issued May 27, 2015, pp. 1-5.

* cited by examiner

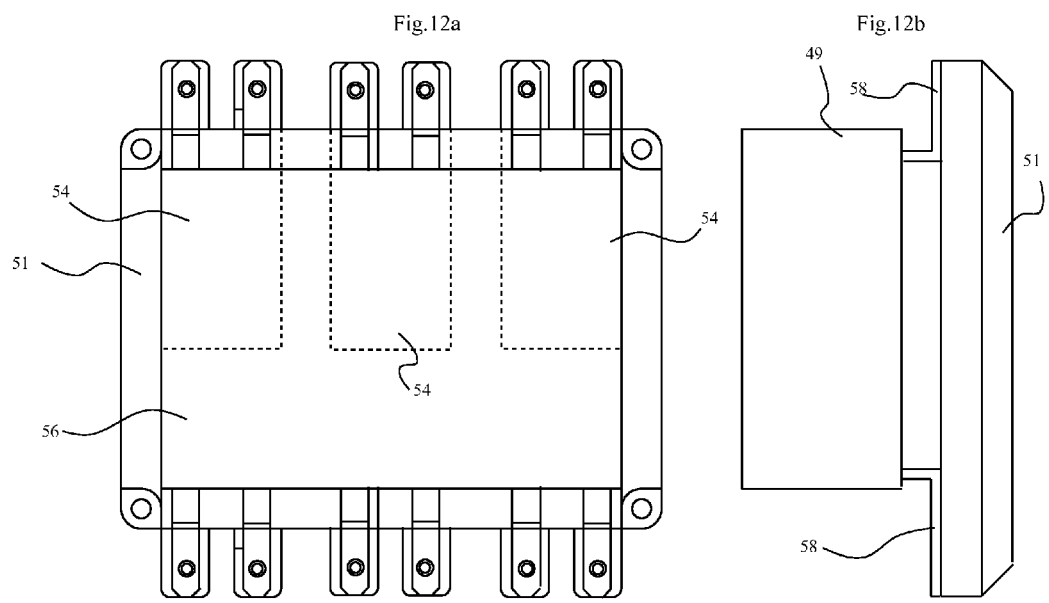

INDIRECT MATRIX CONVERTER

TECHNICAL FIELD

This invention relates to an indirect matrix converter and, more particularly, to such an indirect matrix converter provided with snubber circuits.

BACKGROUND ART

An indirect matrix converter includes a converter, DC intermediate links and an inverter, as disclosed in, for example, Non-patent Literature 1. In the converter, three series circuits each including upper and lower arms of bidirectional switches connected in series are connected in parallel between a pair of DC intermediate links. A three-phase AC power supply is connected through LC filters to respective junctions between the upper and lower arms of the respective series circuits. The LC filters include three series reactors serially connected to the respective ones of the three phases of the three-phase AC power supply and three parallel capacitors connected between the respective phases. A voltage-source inverter having a structure of a common inverter is connected to a pair of DC intermediate links.

CITATION LIST

Non-Patent Literature

Non-patent Literature 1: The Transactions of the Institute of Electrical Engineering of Japan. D Vol. 126 No. 9, Pages 1161-1170, "Technical Trends of Direct AC/AC Converter".

SUMMARY OF INVENTION

Technical Problem

In an indirect matrix converter, the switching of bidirectional switches of the converter is achieved by zero-current switching during a zero vector output period (freewheeling mode period) of the inverter. In other words, the bidirectional switches of the converter are switched when current in the converter is zero. The potential of each of the capacitors of the LC filters connected between the three-phase AC power supply and the converter varies depending on the three-phase AC power supply. Accordingly, if the switching is performed when the potential difference between the two terminals of each capacitor is large, the potential across the parallel capacitor connected to the converter before the switching and the potential across the parallel capacitor connected to the converter after the switching differ from each other, so that the input voltage to the converter varies. Due to this variation, fast pulse current flows in parasitic capacitors of the switching devices of the inverter and the snubber circuits, which results in development of a surge voltage across the switching devices of the inverter. Such surge voltage may break the switching devices. Also, pulse current may flow into gate circuits to cause erroneous triggering.

An object of the present invention is to prevent switching devices of an inverter of an indirect matrix converter from being broken by surge voltage.

Solution to Problem

An indirect matrix converter according to an aspect of the present invention includes a converter, DC buses, and an inverter. The converter includes a parallel connection of three series circuits including bidirectional switch means connected in series as upper and lower arms. To the junctions of the upper and lower arms of bidirectional switch means of the respective ones of the three series circuits, a three-phase AC power supply is connected through input filters including series reactors and parallel capacitors. As each of the bidirectional switch means, unidirectional switching devices, e.g. IGBT's and MOSFET's, which are connected with each other in mutually opposite directions, may be used. The DC buses include a positive polarity bus connected to the end of the parallel circuit of the three series circuits of the converter on the upper arm side and a negative polarity bus connected to the end of the parallel circuit of the three series circuits of the converter on the lower arm side. The inverter includes three series circuits including switch devices, e.g. unidirectional switch devices, serially connected in upper and lower arms, in such a manner that current flows in the same direction. The three series circuits are connected in parallel between the DC buses. A three-phase load is connected to the respective junctions between the upper and lower arms of the three series circuits. The bidirectional switch means of the converter are switched in such a manner that AC power at a frequency higher than that of the three-phase AC power supply is developed between the positive and negative polarity buses. The switch devices of the inverter are switched in such a manner that the AC power between the positive and negative polarity buses is converted to AC power having a frequency higher than the three-phase AC power supply. This indirect matrix converter is not arranged to provide smoothed DC power between the positive and negative polarity buses. During a period of a freewheeling mode of the inverter, i.e. during a time period in which all of the upper arm switch devices are ON and all of the lower arm switches are OFF, or a time period in which all of the upper arm switch devices are OFF and all of the lower arm switches are ON, the switching of the bidirectional switch means is done. One end of positive polarity voltage-drop means is connected to the positive polarity bus, and one end of negative polarity voltage-drop means is connected to the negative polarity bus. A capacitor is connected between the other end of the positive polarity voltage-drop means and the other end of the negative polarity voltage-drop means. A diode or a resistor, for example, may be used as the positive and negative polarity voltage-drop means. When diodes are used, their anodes and cathodes are connected in such a manner that current flows from the positive polarity bus side to the negative polarity bus side. An upper discharge preventing snubber circuit is provided for each of the upper arm switch devices, and a lower discharge preventing snubber circuit is provided for each of the lower arm switch devices. The upper and lower discharge preventing snubber circuits each include a diode, a capacitor and a discharge resistor. For example, in each of the upper discharge preventing snubber circuits, a series circuit of the capacitor and the diode is connected in parallel with the upper arm switch device, with the capacitor disposed on the positive polarity bus side. Similarly, in each of the lower discharge preventing snubber circuits, a series circuit of the capacitor and the diode is connected in parallel with the lower arm switch device, with the capacitor disposed on the negative polarity bus side. In each of the upper and lower discharge preventing snubber circuits, one end of the discharge resistor is connected to the junction of the capacitor and the diode. The other end of the discharge resistor of each of the upper discharge preventing snubber circuits is connected to the other end of the negative voltage-drop means, and the other end of the discharge resistor of each of the lower discharge preventing snubber circuits is connected to the other end of the positive voltage-drop means.

In the described arrangement of an indirect matrix converter, the positive and negative voltage-drop means and the capacitor are connected between the positive and negative polarity DC buses, and the capacitors of the discharge preventing snubber circuits are connected to the two junctions of the positive and negative voltage-drop means and the capacitor, respectively. Accordingly, even when the potentials at the positive and negative polarity DC buses vary, the potentials at these capacitors can be kept constant. Accordingly, if the potentials between the positive and negative polarity DC buses change when the bidirectional switch means of the converter are switched, no transient current flows through the switch means in the inverter and no surge voltage is developed.

Another discharging resistor may be connected between the opposite ends of the capacitor. The discharge time constant of the capacitor and the resistor is desirably set to such a value that the potential at the capacitor remains to be about the maximum voltage of the three-phase AC power supply. By arranging that the voltage between the opposite ends of the capacitor maintains the value of about the maximum voltage of the three-phase AC power supply, the decrease of inverter surge absorbing effect can be prevented.

Another switch device may be used in the indirect matrix converter of the above-described arrangement. This switch device has a conduction path and a control electrode. When a control signal is applied to the control electrode, the conduction path is made conductive. The conduction path of this switch device is connected between the opposite ends of the capacitor. Two resistors are connected in series with each other between the opposite ends of the capacitor. Between the junction of these two resistors and the control electrode, control signal generating means is connected. The control signal generating means provides the control signal to the control electrode when the voltage across the capacitor reaches or exceeds a predetermined value. A Zener diode may be used as the control signal generating means.

In place of the two resistors, detecting means for detecting the voltage across the capacitor, and control signal generating means which provides the control signal to the control electrode of the switch means may be used.

With the described arrangement, the voltage across the capacitor 30 can be maintained at a predetermined value, which ensures the prevention of the decrease of the inverter's surge absorption effect.

In the indirect matrix converter of the above-described embodiment or its modified versions, the positive voltage-drop means, the negative voltage-drop means having their respective one ends connected to the negative polarity bus, the capacitor, and the upper and lower discharge preventing snubber circuits, excluding the discharge resistor of the upper and lower discharge preventing snubber circuits, may be placed in one package, or the positive voltage-drop means, the negative voltage-drop means and the capacitor may be placed in a module.

Such arrangement facilitates mounting of switch means of the inverter to the module. Furthermore, the wiring inductance is reduced, which improves the surge absorbing effect.

BRIEF DESCRIPTION OF DRAWINGS

FIG. 12 is plan and side views of the major portion of the indirect matrix converter of FIG. 11.

Figure 1:
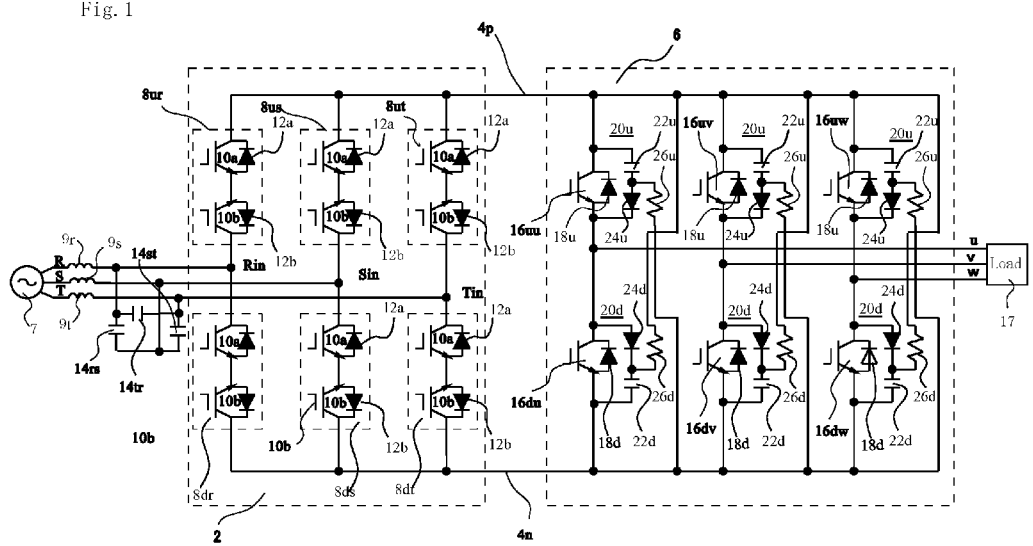
FIG. 1 is a block diagram of reference example which is referenced to in explaining an indirect matrix converter according to a first embodiment of the present invention.

Before giving a description of embodiments of the present invention, a form basic to an indirect matrix converter according to the present invention is described with reference to FIG. 1. This indirect matrix converter includes a converter 2, a positive polarity side DC intermediate link 4p, a negative polarity side DC intermediate link 4n, and an inverter 6.

The converter 2 includes an upper arm including upper bidirectional switch circuits 8ur, 8us and 8ut and a lower arm including lower bidirectional switch circuits 8dr, 8ds and 8dt. The upper bidirectional switch circuit 8ur and the lower bidirectional switch circuit 8dr are connected in series with each other. The upper bidirectional switch circuit 8us and the lower bidirectional switch circuit 8ds are connected in series with each other. The upper bidirectional switch circuit 8ut and the lower bidirectional switch circuit 8dt are connected in series with each other. These three series circuits are connected in parallel. The upper and lower bidirectional switch circuits 8ur and 8dr each include unidirectional switch devices, e.g. IGBTs 10a and 10b. The IGBTs 10a and 10b have their emitters interconnected, and include anti-parallel diodes 12a and 12b connected between the collectors and the emitters thereof, respectively. The IGBT 10a of the upper bidirectional switch circuit 8ur is connected to the positive polarity DC intermediate link 4p, and the IGBT 10b of the upper bidirectional switch circuit 8ur is connected to the collector of the IGBT 10a of the lower bidirectional switch circuit 8dr. The IGBT 10b of the lower bidirectional switch circuit 8dr is connected to the negative polarity DC intermediate link 4n. The upper bidirectional switch circuits 8us and 8ut and the lower bidirectional switch circuits 8ds and 8dt are arranged similarly to the upper bidirectional switch circuit 8ur and the lower bidirectional switch circuit 8dr.

The R phase of a three-phase AC power supply 7 is connected through a DC reactor 9r to the junction Rin between the upper bidirectional switch circuit 8ur and the lower bidirectional switch circuit 8dr. The S phase of the three-phase AC power supply 7 is connected through a DC reactor 9s to the junction Sin between the upper bidirectional switch circuit 8us and the lower bidirectional switch circuit 8ds. The T phase of the three-phase AC power supply 7 is connected through a DC reactor 9t to the junction Tin between the upper bidirectional switch circuit 8ut and the lower bidirectional switch circuit 8dt. A capacitor 14rs is connected between the junctions Rin and Sin. A capacitor 14st is connected between the junctions Sin and Tin. A capacitor 14tr is connected between the junctions Tin and Rin. Input filters are formed by the capacitors 14rs, 14st and 14tr and each of the DC reactors 9s, 9t and 9r.

The inverter 6 includes an upper arm including unidirectional switch devices, e.g. IGBTs, 16uu, 16uv and 16uw, and a lower arm including unidirectional switch devices, e.g. IGBTs, 16du, 16dv and 16dw. The IGBT 16uu has its collector connected to the positive polarity DC intermediate link 4p and has its emitter connected to the collector of the IGBT 16du having its emitter connected, in turn, to the negative polarity DC intermediate link 4n. The other IGBTs 16uv, 16uw, 16dv and 16dw are connected similar to the IGBTs 16uu and 16du. An anti-parallel diode 18u is connected between the collector and the emitter of each of the IGBTs 16uu, 16uv and 16uw, and an anti-parallel diode 18d is connected between the collector and the emitter of each of the IGBTs 16du, 16dv and 16dw. A load, e.g. an electric actuator, 17 is connected to the junction u between the IGBTs 16uu and 16du, to the junction v between the IGBTs 16uv and 16dv, and to the junction w between the IGBTs 16w and 16dw.

A discharge preventing snubber circuit 20u is connected to an associated one of the IGBTs 16uu, 16uv and 16uw, and a discharge preventing snubber circuit 20d is connected to an associated one of the IGBTs 16du, 16dv and 16dw. Each of the discharge preventing snubber circuits 20u includes a series circuit including a snubber capacitor 22u and a snubber diode 24u. These series circuits are connected in parallel with the collector-emitter paths of the IGBTs 16uu, 16uv and 16uw, respectively. Each snubber capacitor 22u has its one end connected to the collector of the associated one of the IGBTs 16uu, 16uv and 16uw and has its other end connected to the anode of the associated one of the snubber diodes 24u. The cathode of each of the snubber diodes 24u is connected to the emitter of the associated one of the IGBTs 16uu, 16uv and 16uw. One end of a snubber discharge resistor 26u is connected to an associated one of the junctions between the snubber capacitors 22u and the associated snubber diodes 24u. The other end of each snubber discharge resistor 26u is connected to the negative polarity DC link 4n.

Each of the discharge preventing snubber circuits 20d includes a series circuit including a snubber capacitor 22d and a snubber diode 24d. These series circuits are connected in parallel with the collector-emitter paths of the IGBTs 16du, 16dv and 16dw, respectively. The anode of each of the snubber diodes 24d is connected to the collector of the associated one of the IGBTs 16du, 16dv and 16dw, and the cathode of each of the snubber diodes 24d is connected to one end of the associated one of the snubber capacitors 22d. The other end of each of the snubber capacitors 22d is connected to the emitter of the associated one of the IGBTs 16du, 16dv and 16dw. One end of a snubber discharge resistor 26d is connected to an associated one of the junctions between the snubber capacitors 22d and the associated snubber diodes 24d. The other end of each snubber discharge resistor 26d is connected to the positive polarity DC link 4p.

The upper and lower bidirectional switch circuits 8ur, 8us, 8ut, 8dr, 8ds and 8dt of the converter 2 and the IGBTs 16uu, 16uv, 16uw, 16du, 16dv and 16dw are ON-OFF controlled by a control circuit (not shown). In particular, the switching of the upper and lower bidirectional switch circuits 8ur, 8us, 8ut, 8dr, 8ds and 8dt takes place during a freewheeling mode of operation of the inverter 6. In other words, the line-to-line voltage applied to the converter 2 is switched when the line-to-line voltage which has been applied to the converter 2 becomes substantially zero while the IGBTs 16uu, 16uv and 16uw are ON and the IGBTs 16du, 16dv and 16dw are OFF, or while the IGBTs 16uu, 16uv and 16uw are OFF and the IGBTs 16du, 16dv and 16dw are ON.

Let the discharge preventing snubber circuit 20u provided for the IGBT 16uv, for example, be considered. When the IGBT 16uv, which has been ON, is turned off, the current which has been flowed through the IGBT 16uv now flows through the snubber capacitor 22u and diode 24u. An amount of energy determined by the current flowing through the wiring inductance and the snubber capacitor 22u is absorbed by the snubber capacitor 22u, causing the voltage across the snubber capacitor 22u to rise to thereby prevent the generation of surge voltage which could otherwise be caused by the parasitic capacitance of the IGBT 16uv. When the voltage of the snubber capacitor 22u is higher than the voltage at the positive polarity DC link 4p, the voltage of the snubber capacitor 22u is discharged through a path extending from the positive polarity DC link 4p through the converter 2 and the negative polarity DC link 4n to the snubber discharge resistor 26u, until the IGBT 16uv is turned off. The IGBTs 16uu and 16uw operate in the similar manner, too, when the IGBTs 16uu and 16uw are turned off. In each of the discharge preventing snubber circuits 20d, although the current flows in the direction opposite to the one in the preventing snubber circuits 20u, each of the discharge preventing snubber circuits 20d operates to prevent generation of surge which could otherwise occur when switching operation takes place in the inverter 6.

However, with the above-described arrangement, due to the switching operation in the inverter 6, there is a possibility that surge would occur in the IGBTs 16uu, 16uv and 16uw of the inverter 6. This will be explained below.

Figure 2:
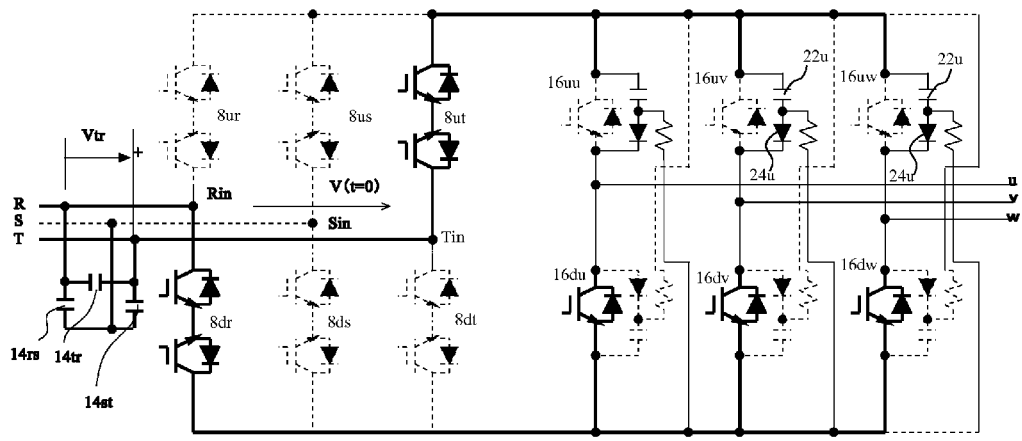
FIG. 2 is a first block diagram for use in explaining a mechanism in which pulse current flows from a converter of the indirect matrix converter of FIG. 1.
Figures 3A, 3B:
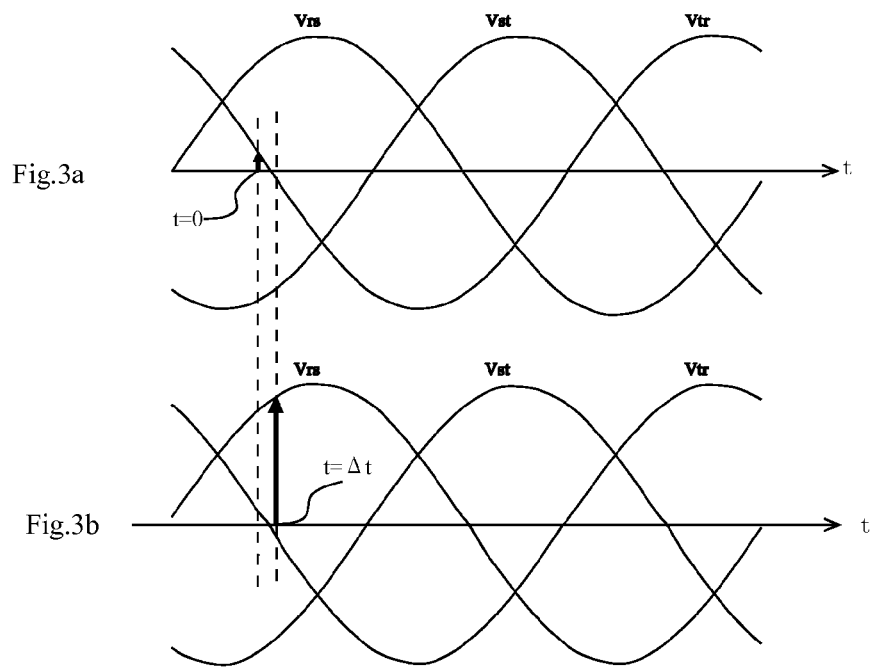
FIG. 3 is a first waveform diagram for use in explaining the mechanism in which pulse current flows from the converter of the indirect matrix converter of FIG. 1.

Let it be assumed, for example, that, as shown in FIG. 2, at a time t=0, the upper bidirectional switch circuit 8ut and the lower bidirectional switch circuit 8dr are ON, the other upper and lower bidirectional switch circuits 8ur, 8us, 8ds and 8dt are OFF, the IGBTs 16du, 16dv and 16dw of the inverter 6 are ON, and the IGBTs 16uu, 16uv and 16uw are OFF. At this time point, the capacitors 14rs, 14st and 14tr are substantially equally at the line-to-line voltage of the three-phase AC power supply, and the voltage between the junctions Tin and Rin, i.e. the line-to-line voltage Vtr which is the voltage across the capacitor 14tr, is applied to the converter 2. Also, the line-to-line voltage Vrs equal to the voltage across the capacitor 14rs is applied between the junctions Rin and Sin. This is illustrated in FIG. 3a.

Figure 4:
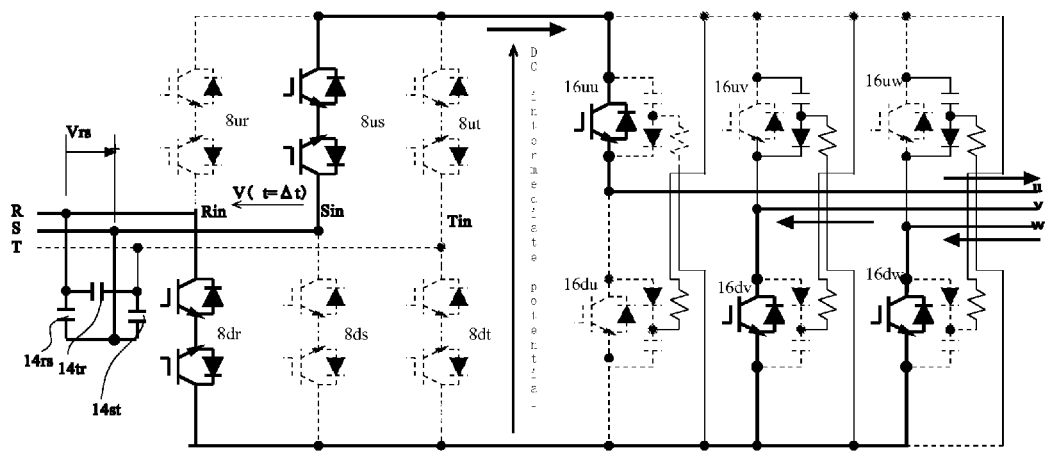
FIG. 4 is a second block diagram for use in explaining the mechanism in which pulse current flows from the converter of the indirect matrix converter of FIG. 1.
Figure 5:
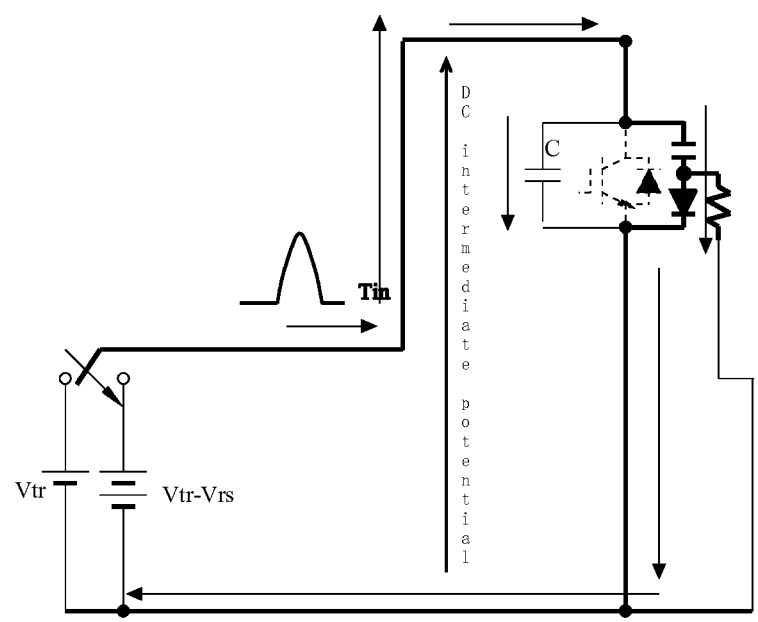
FIG. 5 is a third block diagram for use in explaining the mechanism in which pulse current flows from the converter of the indirect matrix converter of FIG. 1.

Let it be assumed that, at a time t=Δt, which is some time after the time t=0, as shown in FIG. 4, the upper bidirectional switch circuit 8us switches to be ON, the lower bidirectional switch circuit 8dr switches to be ON, the upper bidirectional switch circuits 8ur and 8ut switch to be OFF, the lower bidirectional switch circuits 8ds and 8dt switch to be OFF in the converter 2, and that the IGBTs 16uu, 16dv and 16dw of the inverter 6 switch to be ON and the IGBTs 16uv, 16uw and 16du switch to be OFF. This time, the input voltage to the converter 2 changes to the voltage across the capacitor 14rs connected between the junctions Rin and Sin. This voltage is substantially equal to the line-to-line voltage Vrs, and a potential difference, relative to the voltage at the time t=0, of Vtr−Vrs occurs in the input voltage of the converter 2. The change of the input voltage to the converter 2 is shown in FIG. 3*b*. As a result, due to transient caused by change in input voltage, pulse current flows into the positive and negative polarity DC intermediate links 4*p* and 4*n*, as is seen in FIG. 5 which schematically shows only one phase. In FIG. 5, a capacitor C represents parasitic capacitance of the IGBTs in the inverter 6.

Figure 6:
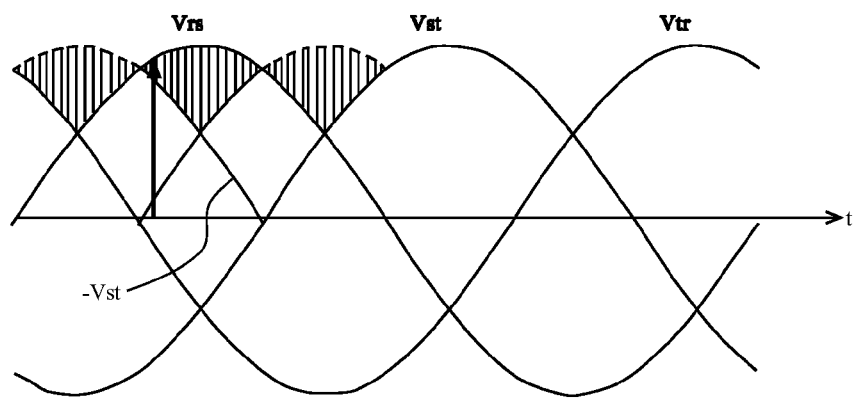
FIG. 6 is a second waveform diagram for use in explaining the mechanism in which pulse current flows from the converter of the indirect matrix converter of FIG. 1.

FIG. 6 shows the voltages Vrs, Vst and Vtr of the capacitors 14*rs*, 14*st* and 14*tr*, on which the waveform of voltage between the positive polarity and negative polarity DC intermediate links 4*p* and 4*n* are superposed. As is seen from FIG. 6, when the above-described potential change occurs at the time t=Δt, the DC intermediate potential is chopped by a carrier frequency, or, in other words, the DC intermediate potential decreases to a potential of −Vst due to the switching in the converter 2. Accordingly, the capacitors in the discharge preventing snubber circuits discharge to decrease to the potential −Vst. Then, pulse current flows into the capacitors in the discharge preventing snubber circuits and the parasitic capacitance of the IGBTs, and surge of Cdv/dt is generated between the collector and the emitter of each IGBT. The letter C represents the capacitance and dv/dt is potential variation. This is due to a process that the discharge preventing snubber circuit 20*u* is arranged to make the charge on the snubber capacitor 20*u* discharge through the snubber discharge resistor 26*u* by the time the associated IGBT next turns off, and due to the arrangement that the snubber discharge resistor 26*u* is connected to the negative polarity DC intermediate link 4*n*, with the snubber discharge resistor 20*d* connected to the positive polarity DC intermediate link 4*p*, and the snubber capacitor 22*u* discharges to the DC intermediate potential if the discharge time constant of the snubber capacitor 20*u* and the snubber discharge resistor 26*u* is small enough relative to the switching period of the converter 2.

Figure 7:
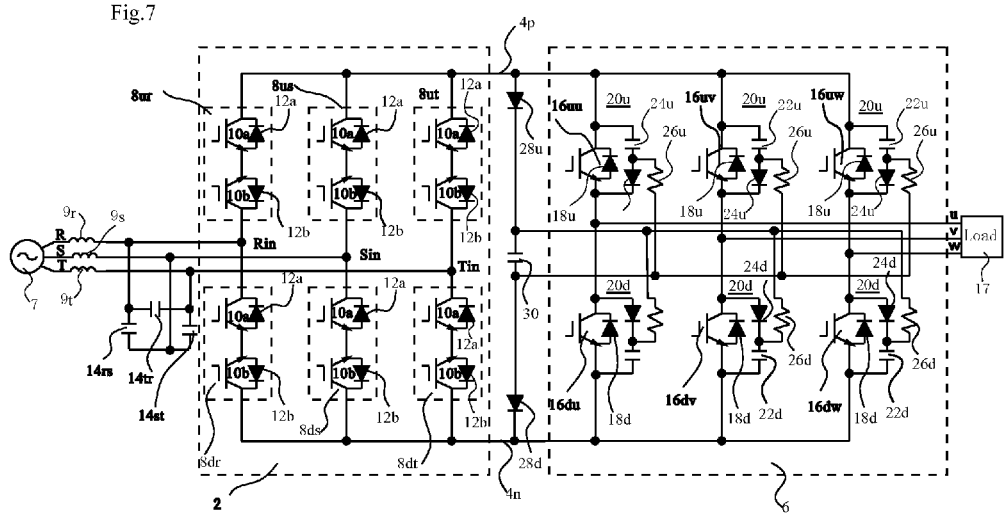
FIG. 7 is a block diagram of an indirect matrix converter according to the first embodiment of the present invention.

An indirect matrix converter according to a first embodiment is to prevent the above-described surge, and includes, as shown in FIG. 7, upper voltage-drop means, e.g. a clamp diode 28*u*, connected to a positive polarity DC intermediate link 4*p*. The anode of the clamp diode 28*u* is connected to the positive polarity DC intermediate link 4*p*. One end of a capacitor 30 is connected to the cathode of the clamp diode 28*u*. To the other end of the capacitor 30, lower voltage-drop means, e.g. a clamp diode 28*d*, is connected. The anode of the clamp diode 28*d* is connected to the other end of the capacitor 30. The cathode of the clamp diode 28*d* is connected to the negative polarity DC intermediate link 4*n*.

Also, the other end of the snubber discharge resistor 26*u* of each of the upper discharge preventing snubber circuits 20*u* is connected to the junction between the capacitor 30 and the anode of the lower clamp diode 28*d*, and the other end of the snubber discharge resistor 26*d* of each of the lower discharge preventing snubber circuits 20*d* is connected to the junction between the capacitor 30 and the cathode of the upper clamp diode 28*u*. The remainder of the in direct matrix converter of FIG. 7 is the same as the one of the above-described basic arrangement, and, therefore, the same reference numerals and symbols are attached to the same or equivalent portions, and no description is given any more about it.

In this indirect matrix converter, the potential at the junction between the capacitor 30 and the cathode of the upper clamp diode 28*u* is clamped to the potential which is equal to the peak potential of the absolute value of Vrs, Vst and Vts minus the voltage drop in the clamp diode 28*u*, and does not vary. The potential at the junction between the capacitor 30 and the anode of the lower clamp diode 28*d* is clamped to the potential which is equal to the cross potential of the absolute values of Vrs, Vst and Vts plus the voltage drop in the clamp diode 28*d*, and does not vary. Like this, the other end of the snubber discharge resistor 26*d* of each lower discharge preventing snubber circuit 20*d* is connected to the junction between the capacitor 30 and the cathode of the upper clamp diode 28*u*, the potential at which does not vary. Similarly, the other end of the snubber discharge resistor 26*u* of each upper discharge preventing snubber circuit 20*u* is connected to the junction between the capacitor 30 and the anode of the lower clamp diode 28*d*, the potential at which junction does not vary. Then, even when the DC intermediate potential varies due to switching in the converter 2, the snubber capacitors 22*u* discharge only to the potential at the junction between the capacitor 30 and the anode of the lower clamp diode 28*d*, and the snubber capacitors 22*d* discharge only to the potential at the junction between the capacitor 30 and the cathode of the upper clamp diode 28*d*. Thus, even when the switching takes place in the converter 2, it never occurs for the potential at the capacitor 22*u* to decrease below the potentials at the capacitors 14*rs*, 14*st* and 14*tr*, so that no current flows from the capacitors 14*rs*, 14*st* and 14*tr* to the snubber capacitors 22*u*.

Figure 8:
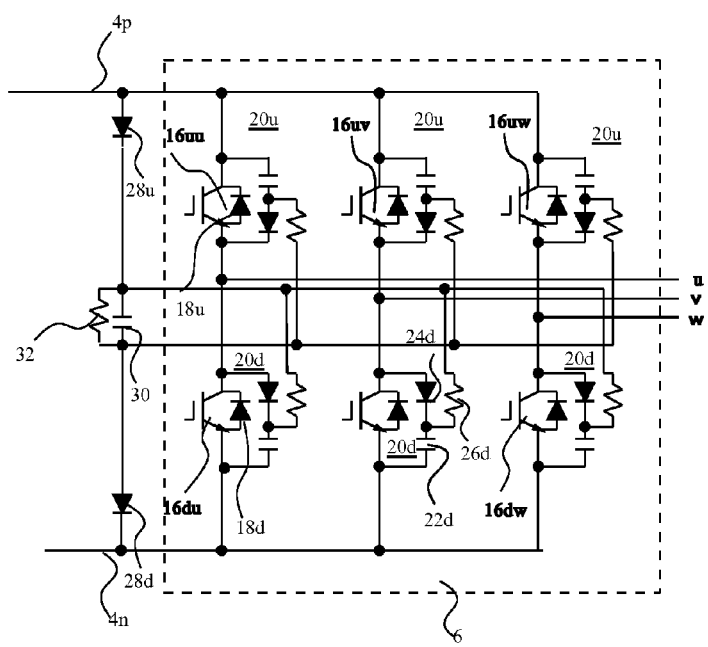
FIG. 8 is a block diagram of a major portion of an indirect matrix converter according to a second embodiment of the invention.

FIG. 8 shows a part of an indirect matrix converter according to a second embodiment. This indirect matrix converter includes a discharge resistor 32 connected in parallel with the capacitor 30. The arrangement of the other part is the same as that of the indirect matrix converter according to the first embodiment, and therefore no description in given any more about it. The resistance of the discharge resistor 32 is set at such a value that the discharge resistor 32 and the capacitor 30 provides such a discharge time constant that the potential at the capacitor 30 can keep a value of about the maximum voltage provided by the three-phase AC power supply.

In the indirect matrix converter according to the first embodiment, there is a possibility that the charge voltage of the capacitor 30 rises depending on the balance between leakage current from the clamp diodes 28*u* and 28*d* and surge voltage. Increase of the charge voltage causes the potential of the snubber capacitors 22*u* and 22*d* to rise, which results in decrease of the surge absorption effect in the inverter 6. Consequently, the surge voltage may increase when switching occurs in the inverter 6. In order to deal with it, the indirect matrix converter according to the second embodiment uses the discharge resistor 32 to make the capacitor 30 to discharge to a voltage about the same as the maximum voltage of the power supply. With this arrangement, while preventing the pulse current from the converter 2, a margin for reducing the surge in the inverter is secured.

Figure 9:
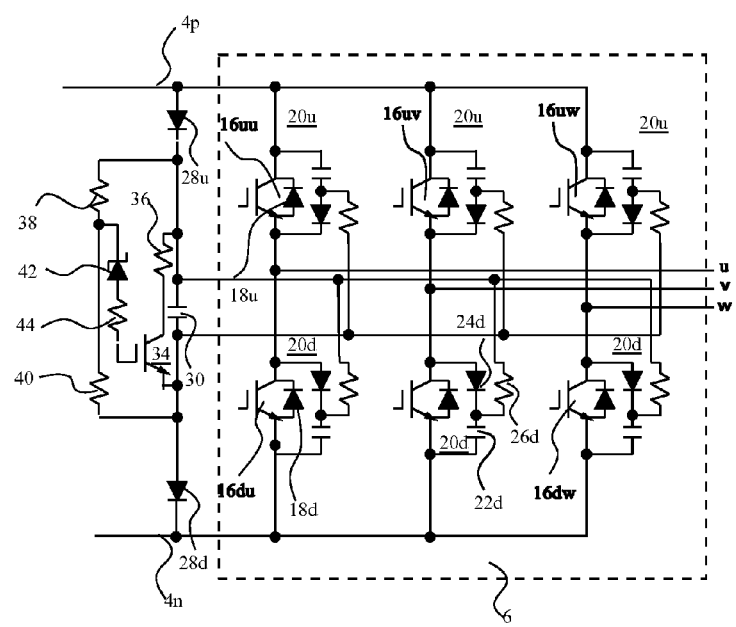
FIG. 9 is a block diagram of a major portion of an indirect matrix converter according to a third embodiment of the invention.

A major part of an indirect matrix converter according to a third embodiment is shown in FIG. 9. In this indirect matrix converter, a series circuit of a switch device, e.g. an IGBT 34, and a discharge resistor 36 is connected to opposite ends of the capacitor 30, with the collector-emitter conduction path of the IGBT 34 connected in series with the discharge resistor 36. In addition, a series circuit of resistors 38 and 40 is connected across the capacitor 30. Control signal generating means, e.g. a series circuit of a Zener diode 42 and a resistor 44, is connected between the junction of the resistors 38 and 40 and a control electrode, e.g. a gate electrode, of the IGBT 34. The arrangement of the remaining part is the same as that of the indirect matrix converter according to the first embodiment, and, therefore, the same reference numerals and symbols are attached to the same components. No description about it is given any more.

In the indirect matrix converter according to the second embodiment, since the discharge resistor 32 is connected between the positive and negative polarity DC intermediate links 4*p* and 4*n* through the upper and lower clamp diodes 28*u* and 28*d*, respectively, the capacitance of the capacitor 30 must sometimes be set at a large value while using a small value for the discharge resistor 32. In such a situation, the wattage of the discharge resistor 32 is disadvantageously large. The indirect matrix converter according to the third embodiment can solve this problem. According to the third embodiment, the resistance of the resistors 38 and 40 is set at large values relative to the value of the resistor 32, and the voltage of the capacitor 30 is monitored by these resistors 38 and 40. The IGBT 34 is turned on to discharge charges on the capacitor 30 through the discharge resistor 36 when the voltage across the resistor 40 exceeds the Zener voltage of the Zener diode 42.

Figure 10:
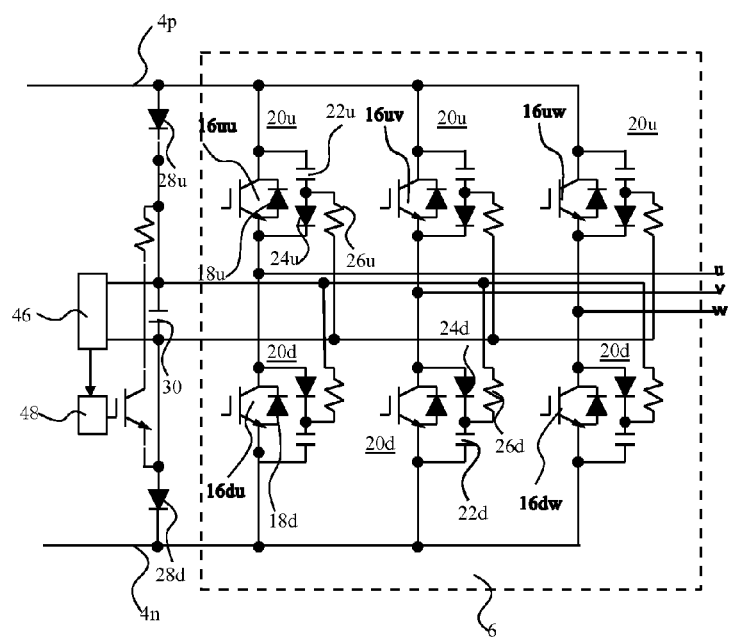
FIG. 10 is a block diagram of a major portion of an indirect matrix converter according to a fourth embodiment of the invention.

FIG. 10 shows a major part of an indirect matrix converter according to a fourth embodiment. This indirect matrix converter is a modified version of the indirect matrix converter according to the third embodiment, and includes a voltage sensor 46 connected between the opposite ends of the capacitor 30 for detecting the voltage across the capacitor 30, and control signal generating means, e.g. a turn-on signal generator 48, which supplies a turn-on signal to the IGBT 34 when the voltage sensor 46 detects the voltage across the capacitor 30 exceeding a predetermined voltage. The arrangement of the remainder is the same as that of the indirect matrix converter according to the third embodiment. Therefore the same reference numerals and symbols are used for the same portions, and no more description about them is given.

Figure 11:
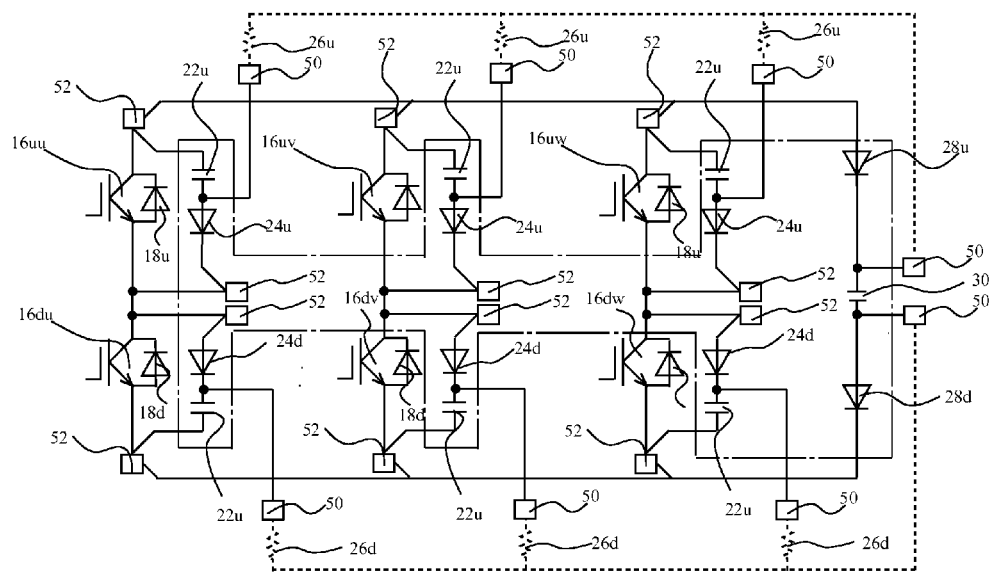
FIG. 11 is a block diagram of a major portion of an indirect matrix converter according to a fifth embodiment of the invention.

FIGS. 11 and 12 show a major part of an indirect matrix converter according to a fifth embodiment. The circuit arrangement of this indirect matrix converter is that of one of the indirect matrix converters according to the first through fourth embodiments. The snubber capacitors 22u and 22d and snubber diodes 24u and 24d of the discharge preventing snubber circuits 20u and 20d, the clamp diodes 28u and 28d and the capacitor 30, which are within an area defined by a dot-and-dash line, are housed in a package 49 shown in FIG. 12b. The components with a reference numeral "50" attached are terminal pads on the package 49. The IGBTs 16uu through 16dw are formed in a single module 51 as shown in FIG. 12b, and reference numeral "52" represents terminal pads on the module 51. Within the package 49, the snubber capacitors 22u and the snubber diodes 24u are grouped into three snubber units 54 one for each phase, as shown in FIG. 12a. A clamp snubber unit 56 composed of the clamp diodes 28u and 28d and the capacitor 30 is disposed above or beneath the three snubber units 54. The package 49 is mounted on a module 51 by mounting devices 58. Like this, by housing in the single package 49, the components can be easily mounted on the module.

In the above-described embodiments, IGBTs are used as the switch devices, but the invention is not limited to it. For example, other self-turn-off semiconductor switch devices, e.g. MOSFETs, may be used. In place of the diodes 28u and 28d used as the voltage-drop means in the described embodiments, resistors, for example, may be used. Further, in the fifth embodiment, it may be arranged such that only the clamp diodes 28u and 28d and the capacitor 30 are packaged in one package.

The invention claimed is:

1. An indirect matrix converter comprising:
  a converter comprising three series circuits connected in parallel, each of said three series circuits being formed of serially connected bidirectional switch means connected in upper and lower arms, a three-phase AC power supply being connected to the junctions between the upper and lower arms of said three series circuits through input filters each including a reactor and parallel capacitors;
  DC buses including a positive polarity bus provided by an upper arm end of a parallel circuit formed of said three series circuits, and a negative polarity bus provided by a lower arm end of said parallel circuit; and
  an inverter comprising three series circuits each including upper and lower arms of switch devices connected in such a manner that current flows in the same direction, said three series circuits being connected in parallel with each other between said DC buses, a three-phase load being connected to the junctions between said upper and lower arms of said three series circuits;
  wherein said indirect matrix converter further comprises:
  positive polarity voltage-drop means having its one end connected to said positive polarity bus;
  negative polarity voltage-drop means having its one end connected to said negative polarity bus;
  a capacitor connected between the other end of said positive polarity voltage-drop means and the other end of said negative polarity voltage-drop means;
  an upper discharge preventing snubber circuit provided in association with each of said switch devices of said upper arm of said inverter; and
  a lower discharge preventing snubber circuit provided in association with each of said switch devices of said lower arm of said inverter;
  a discharge resistor of each of said upper discharge preventing snubber circuits being connected to said other end of said negative polarity voltage-drop means, a discharge resistor of each of said lower discharge preventing snubber circuits being connected to said other end of said positive polarity voltage-drop means.

2. The indirect matrix converter according to claim 1, wherein an additional discharge resistor is connected between opposite ends of said capacitor.

3. The indirect matrix converter according to claim 1, further comprising:
  a switch device having a conduction path connected between opposite ends of said capacitor, said conduction path being made conductive when a control signal is applied to a control electrode of said switch device;
  two resistors connected in series between said opposite ends of said capacitor; and
  control signal generating means connected between a junction of said two resistors and said control electrode for providing said control signal to said control electrode when a voltage of said capacitor becomes equal to or above a predetermined value.

4. The indirect matrix converter according to claim 1, further comprising:
  a switch device having a conduction path connected between opposite ends of said capacitor, said conduction path being made conductive when a control signal is applied to a control electrode of said switch device;
  detecting means for detecting a voltage across said capacitor; and
  control signal generating means providing said control signal to said control electrode when said detecting means detects a voltage equal to or above a predetermined value.

5. The indirect matrix converter according to claim 1, wherein said positive polarity voltage-drop means, said negative polarity voltage-drop means having its one end connected to said negative polarity bus, said capacitor, and said upper and lower discharge preventing snubber circuits, excluding the discharge resistors of said upper and lower discharge preventing snubber circuits, are housed in a single package.

6. The indirect matrix converter according to claim 1, wherein said positive polarity voltage-drop means, said negative polarity voltage-drop means, and said capacitor are formed as a module.

\* \* \* \* \*